(12) United States Patent
White et al.

(10) Patent No.: US 12,428,294 B2
(45) Date of Patent: Sep. 30, 2025

(54) PROCESS AND APPARATUS FOR CRACKING AMMONIA

(71) Applicant: Air Products and Chemicals, Inc., Allentown, PA (US)

(72) Inventors: Vincent White, Surrey (GB); Simon Craig Saloway, Surrey (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 509 days.

(21) Appl. No.: 17/990,837

(22) Filed: Nov. 21, 2022

(65) Prior Publication Data

US 2024/0166506 A1 May 23, 2024

(51) Int. Cl.
*C01B 3/04* (2006.01)
*B01D 53/04* (2006.01)
(Continued)

(52) U.S. Cl.
CPC .......... *C01B 3/047* (2013.01); *B01D 53/0438* (2013.01); *B01D 53/047* (2013.01); *B01J 8/0492* (2013.01); *B01J 8/0496* (2013.01); *B01J 8/062* (2013.01); *B01J 8/065* (2013.01); *B01J 8/067* (2013.01); *C01B 3/56* (2013.01); *B01D 2256/16* (2013.01); *B01D 2257/102* (2013.01); *B01D 2257/406* (2013.01);
(Continued)

(58) Field of Classification Search
CPC .............. B01D 53/0438; B01D 53/047; B01D 2256/16; B01D 2257/102; B01D 2257/406; B01J 8/0492; B01J 8/0496; B01J 8/062; B01J 8/065; B01J 8/067; B01J 2208/00176; B01J 2208/00407; B01J 2208/00504; C01B 3/047; C01B 3/56; C01B 2203/042; C01B 2203/043; C01B 2203/0465; C01B 2203/0811; C01B 2203/0816; C01B 2203/085; C01B 2203/0883; C01B 2203/0888
See application file for complete search history.

(56) References Cited

U.S. PATENT DOCUMENTS 11,084,012 B2   8/2021  Jiang et al.
11,287,089 B1   3/2022  Cohen et al.
(Continued)

FOREIGN PATENT DOCUMENTS

CN   111957270 A    11/2020
CN   112050202 A1   12/2020
(Continued)

OTHER PUBLICATIONS

Machine translation of WO 2022145661 (Year: 2022).*
(Continued)

*Primary Examiner* — Brian A McCaig
(74) *Attorney, Agent, or Firm* — Matthew R. Weaver

(57) ABSTRACT

Processes for cracking ammonia are improved by using heat generated in a compression unit that is used to compress PSA off gas being recycled to a PSA unit to pre-heat liquid ammonia prior to vaporization and cracking. The heat is transferred using a heat transfer fluid such as an aqueous solution comprising from about 50 wt. % to about 60 wt. % of a glycol, e.g., ethylene glycol or propylene glycol.

24 Claims, 2 Drawing Sheets

(51) Int. Cl.
 *B01D 53/047* (2006.01)
 *B01J 8/04* (2006.01)
 *B01J 8/06* (2006.01)
 *C01B 3/56* (2006.01)

(52) U.S. Cl.
 CPC ............... *B01J 2208/00176* (2013.01); *B01J 2208/00407* (2013.01); *B01J 2208/00504* (2013.01); *C01B 2203/042* (2013.01); *C01B 2203/0465* (2013.01); *C01B 2203/0811* (2013.01); *C01B 2203/085* (2013.01); *C01B 2203/0883* (2013.01)

(56) References Cited

U.S. PATENT DOCUMENTS

| | | |
|---|---|---|
| 2015/0217278 A1 | 8/2015 | Hosono et al. |
| 2017/0203963 A1 | 7/2017 | Ravikumar et al. |
| 2017/0320729 A1 | 11/2017 | Saloway |
| 2020/0398240 A1 | 12/2020 | Jiang et al. |
| 2021/0001311 A1 | 1/2021 | Wu et al. |
| 2022/0189560 A1 | 6/2022 | Zhang et al. |

FOREIGN PATENT DOCUMENTS

| | | | |
|---|---|---|---|
| EP | 3241805 A1 | 11/2017 | |
| GB | 977830 A1 | 12/1964 | |
| GB | 1142941 | 2/1969 | |
| GB | 1353751 | 5/1974 | |
| JP | 5330802 A2 | 12/1993 | |
| KR | 102247199 B1 * | 5/2021 | ........... B01D 53/047 |
| KR | 20220398240 A | 6/2022 | |
| WO | 2021257944 A1 | 12/2021 | |
| WO | 2022189560 A | 9/2022 | |
| WO | 2022189560 A1 | 9/2022 | |

OTHER PUBLICATIONS

Lamb, Krystina, et al; Ammonia decomposition kinetics over LiOH-promoted, a-Al2O3-supported Ru catalyst, International Journal of Hydrogen Energy; 44, Dec. 17, 2018 3726-3736.

Boisen, Astrid et al; Why the optimal ammonia synthesis catalyst is not the optimal ammonia decomposition catalyst, Journal of Catalysis 230 Dec. 10, 2004, 309-312.

Ganley, J.C. et al; "A priori catalytic activity correlations: the difficult case of hydrogen production from ammonia"; Catalysis Letters vol. 96, Nos. 3-4, Jul. 2004.

* cited by examiner

PROCESS AND APPARATUS FOR CRACKING AMMONIA

TECHNICAL FIELD OF THE INVENTION

The present invention is in the technical field of ammonia cracking to produce hydrogen and relates specifically to a process and apparatus for the production of hydrogen gas from liquid ammonia.

BACKGROUND OF THE INVENTION

Global interest in renewable energy and using this renewable energy to generate "green" hydrogen has driven the interest in converting the "green" hydrogen to "green" ammonia, as ammonia is simpler to transport over distance of hundreds or thousands of miles. Particularly, shipping liquid hydrogen is not commercially possible currently but shipping ammonia, which is in a liquid state, is currently practiced.

For use in a commercial fuel cell, the ammonia must be converted back to hydrogen according to the reaction.

$$2NH_3 \rightleftharpoons 3H_2 + N_2$$

This is an endothermic process, i.e., a process that requires heat, and hence higher temperatures will favor production of the products. The standard heat of reaction (per mole of ammonia) at 1 bar and 0° C. is 45.47 kJ/mol. The endothermic nature of the process dictates the need for a furnace.

The process is known as cracking (or sometimes "dissociation") and is usually performed over a catalyst. The gas produced (or "cracked gas") is a mixture of hydrogen ($H_2$) and nitrogen ($N_2$) gases although, since the cracking reaction is an equilibrium reaction, there is also some residual ammonia. The amount of ammonia in the cracked gas, generally referred to as "ammonia slip", may be varied by changing the temperature and pressure at which the ammonia is cracked with higher temperatures and pressures favoring conversion thereby reducing the ammonia slip.

In most applications of crackers currently, the hydrogen and nitrogen mixture is utilised as is. However, as ammonia can be a poison to fuel cells, this stream, with ammonia suitably removed such as by scrubbing with water, can be used directly in a fuel cell. However, if the hydrogen is to be used in vehicle fueling, the nitrogen present provides a penalty to the process. The fuel to a vehicle fueling system is compressed to significant pressure—up to 900 bar. This means that the nitrogen, which is merely a diluent in the process, is also compressed, taking power, and taking storage volume and increasing anode gas purge requirement, decreasing efficiency. It is therefore beneficial where hydrogen is to be used in vehicle fueling, for the hydrogen and nitrogen to be separated.

There are many examples of ammonia cracking processes in the art, for example GB977830A, JP5330802A, CN111957270A, US2020/0398240A and KR2022/0085469A.

In addition, GB1142941A discloses a process for producing a fuel gas that is interchangeable with town gas. Ammonia is cracked to form a mixture of hydrogen and nitrogen and the mixture is then enriched by the addition of a gas having a calorific value higher than that of the mixture such as methane, propane or butane or mixtures thereof. Liquid ammonia is pumped as a cold liquid and vaporised by a closed hot water circuit. The ammonia vapor is cracked over a suitable catalyst in the tubes of a direct fired tube furnace after having been superheated by heat exchange with the flue gas from the furnace. The cracked gas is scrubbed with water to recover residual ammonia which is eventually recycled to the ammonia feed to the catalyst-filled tubes of the furnace. The purified cracked gas is enriched with propane and/or butane to produce the town gas product.

GB1142941A discloses that the cracking of the ammonia in a direct fired tube furnace in the presence of a suitable catalyst is preferred. However, the reference also discloses that other cracking processes could be used instead. In this context, GB1142941 mentions heating the ammonia to a suitable temperature and then passing the ammonia through an unheated bed of ammonia cracking catalyst to crack a proportion of the ammonia into hydrogen and nitrogen, cooling the gas in the process. The unconverted ammonia could be recovered as described above. Alternatively, the gas mixture could be reheated and passed through a second bed of catalyst to reduce further the ammonia content and that this could be repeated as many times as considered desirable.

GB1353751A discloses a process in which ammonia at a pressure in a range from 20 atm to 300 atm is cracked in two stages within heated reactor tubes. In the first stage, the gas at a temperature in a range from 450 to 800° C. is passed through a layer of nickel-, iron- or cobalt-containing catalyst produced by co-precipitating with a carrier of aluminum oxide and magnesium oxide or magnesium-aluminum spinel. The catalyst of the first stage may alternatively consist of either a ceramic material impregnated with iron or iron impregnated on a pre-formed carrier consisting of magnesium oxide and aluminum oxide and promoted with potassium oxide. After the first stage, the gas then passes at a temperature in a range from 450 to 600° C. through a layer of a doubly or triply promoted iron catalyst which forms the second stage.

GB1353751A mentions specifically the difficulty with nitriding of the metal of the reactor tubes at high temperatures and ammonia concentrations. Metal nitriding is a recognized problem in ammonia crackers which can lead to brittle fracture of reactor vessels or tubes. The amount of nitriding is dependent on the partial pressures of ammonia, nitrogen, and hydrogen and the temperature of the system. Nitriding is most severe at higher temperatures and higher partial pressure of ammonia and nitrogen with ammonia being the greater risk at typical ammonia cracking temperatures (nitriding due to nitrogen is not likely until the temperature is excessively high for ammonia cracking, e.g., 1000° C. or more). The exact extent to which the material of construction forms nitrides is currently unknown. However, there is data to indicate that below 650° C. the extent of nitriding should be acceptable depending on the chosen material of construction. GB1353751A does not exemplify a process in which the reactor tubes are heated to a temperature above 600° C., presumably because the authors had not actually solved the nitriding problem at higher temperatures.

WO2022/189560A discloses an ammonia cracking process involving a fired reactor having tubes filled with iron catalyst. Liquid ammonia is taken from storage, pumped and then pre-heated and evaporated to form ammonia gas which is heated by heat exchange with cracked gas. The heated ammonia gas is further heated by heat exchange against flue gas in the convection section of the fired reactor and is then fed to two adiabatic reactors in series (with interstage heating against flue gas) where it is partially cracked. The partially cracked gas is then heated by heat exchange with the flue gas in the convection section before being fed to the catalyst-filled tubes of the fired reactor to crack the remaining ammonia.

U.S. Pat. No. 11,287,089A discloses a hydrogen fueling system in which ammonia is cracked onsite into hydrogen and nitrogen in an ammonia cracker operating at a pressure in the range from 5 bar to 40 bar, and in which the hydrogen is compressed to a pressure of at least 30 MPa (300 bar) and stored ready for dispensing to vehicles. When being dispensed, the compressed gas from storage is cooled to a temperature in a range from −40° C. to 5° C., by heat exchange with a heat exchange fluid, such as D-limonene, FP40 or a water/glycol mixture, circulating around a closed loop. The heat exchange fluid is cooled by heat exchange with the ammonia feed to the cracker and may be further cooled in a conventional refrigeration system. Where the ammonia feed is liquid, at least part of the duty required to vaporize the liquid ammonia is provided by the heat exchange fluid. The vaporization of liquid ammonia is usually effected at normal or sub-atmospheric pressure. U.S. Pat. No. 11,287,089A exemplifies a system producing 7.5 tons/day hydrogen gas.

There is, however, still a need generally for improved processes for the production of hydrogen from ammonia and specifically for processes that are more efficient in terms of energy consumption and/or that have higher levels of hydrogen recovery and/or that reduce or eliminate the need to combust fossil fuels.

BRIEF SUMMARY OF THE INVENTION

According to a first aspect of the present invention, there is provided a process for cracking ammonia comprising warming heat transfer fluid to produce a warmed heat transfer fluid; pumping liquid ammonia to produce a pumped liquid ammonia; pre-heating the pumped liquid ammonia produce a pre-heated liquid ammonia; vaporizing the pre-heated liquid ammonia to produce an ammonia gas; heating the ammonia gas to produce a heated ammonia gas; combusting a fuel with an oxidant gas in a furnace to heat catalyst-containing reactor tubes and produce a flue gas; feeding the heated ammonia gas, or a partially cracked ammonia gas derived therefrom, to the catalyst-containing reactor tubes to cause cracking of ammonia and produce a cracked gas comprising hydrogen gas, nitrogen gas and residual ammonia gas; cooling the cracked gas to produced cooled cracked gas; and recovering hydrogen gas from the cooled cracked gas in a pressure swing adsorption (PSA) unit to produce a hydrogen gas as product and PSA off gas comprising nitrogen gas, residual hydrogen gas and residual ammonia gas. A portion of the PSA off gas is compressed in a compression unit to produce compressed PSA off gas which is recycled to the PSA unit and at least part of the duty required to warm the heat transfer fluid is provided by using the heat transfer fluid to cool the compression unit. In addition, a part of the duty required to pre-heat the pumped liquid ammonia is provided by heat exchange with the warmed heat transfer fluid.

The Inventors have identified that using heat from a PSA off gas compressor unit to provide a part of the duty required to preheat liquid ammonia enables a saving in cooling water and achieves a lower temperature for the compressed PSA off gas enabling a power saving. The lower temperature could mean that that water and ammonia condense out of the compressed gas which can be used in an SCR.

The Inventors have realized, however, if the heat exchange fluid is cooled to such a low level, there may not be enough flow of heat exchange fluid to provide the required intercooling. Therefore, the optimum solution may in fact be to operate at a higher temperature. Keeping the temperatures above the point at which water and ammonia condense in the off gas compressor uses more power than a potential lower temperature cycle but removes the complication of dealing with a two-phase stream.

The heat exchange fluid operating temperatures remain consistent through various operating scenarios, such as normal design, and start-up nitrogen recirculation mode which minimizes control requirements.

The Inventors have also realized that there is typically a need to balance cooling duty (e.g., compressor cooling and cracked gas cooling) and heating (e.g., ammonia heating). Accordingly, heat from an external source, e.g., an electric heater, will normally be required to maintain the heating of the heat transfer fluid when the PSA off gas compressor is not operational and, in some embodiments, extra cooling of recirculating glycol may be required when the PSA off gas compressor is operating, which may be provided by, for example, cooling water or an air cooler.

According to a second aspect of the present invention, there is provided apparatus for cracking ammonia comprising a source of liquid ammonia; a pump comprising an inlet in fluid flow communication with the source of liquid ammonia and an outlet for pumped liquid ammonia; a furnace comprising a radiant section comprising at least one inlet for fuel and oxidant gas in fluid flow communication with at least one burner, an ammonia feed inlet in fluid flow communication with the pump, and catalyst-filled reactor tubes having upstream ends in fluid flow communication with the ammonia feed inlet and downstream ends in fluid flow communication with an outlet for cracked gas, and a convection section in fluid flow communication with the radiant section comprising an outlet for flue gas, a PSA unit comprising an inlet in fluid flow communication with the outlet for cracked gas in the radiant section of the furnace, an outlet for hydrogen gas and an outlet for PSA off gas; and a compression unit comprising an inlet in fluid flow communication with the outlet for PSA off gas in the PSA unit, and an outlet for compressed PSA off gas in fluid flow communication with the inlet of the PSA unit. The apparatus further comprises at least one cooler located within the compression unit and arranged for cooling the compression unit by heat exchange against a heat transfer fluid; a pre-heating unit located downstream of the pump and arranged for pre-heating pumped liquid ammonia by heat exchange against the heat transfer fluid; and at least one heat exchanger located upstream of the ammonia feed inlet of the furnace for vaporizing pre-heated liquid ammonia and heating ammonia gas by heat exchange with the cracked gas.

The apparatus of the second aspect of the invention is particularly suitable to carry out the process of the first aspect of the invention.

DESCRIPTION OF THE INVENTION

Figure 1:
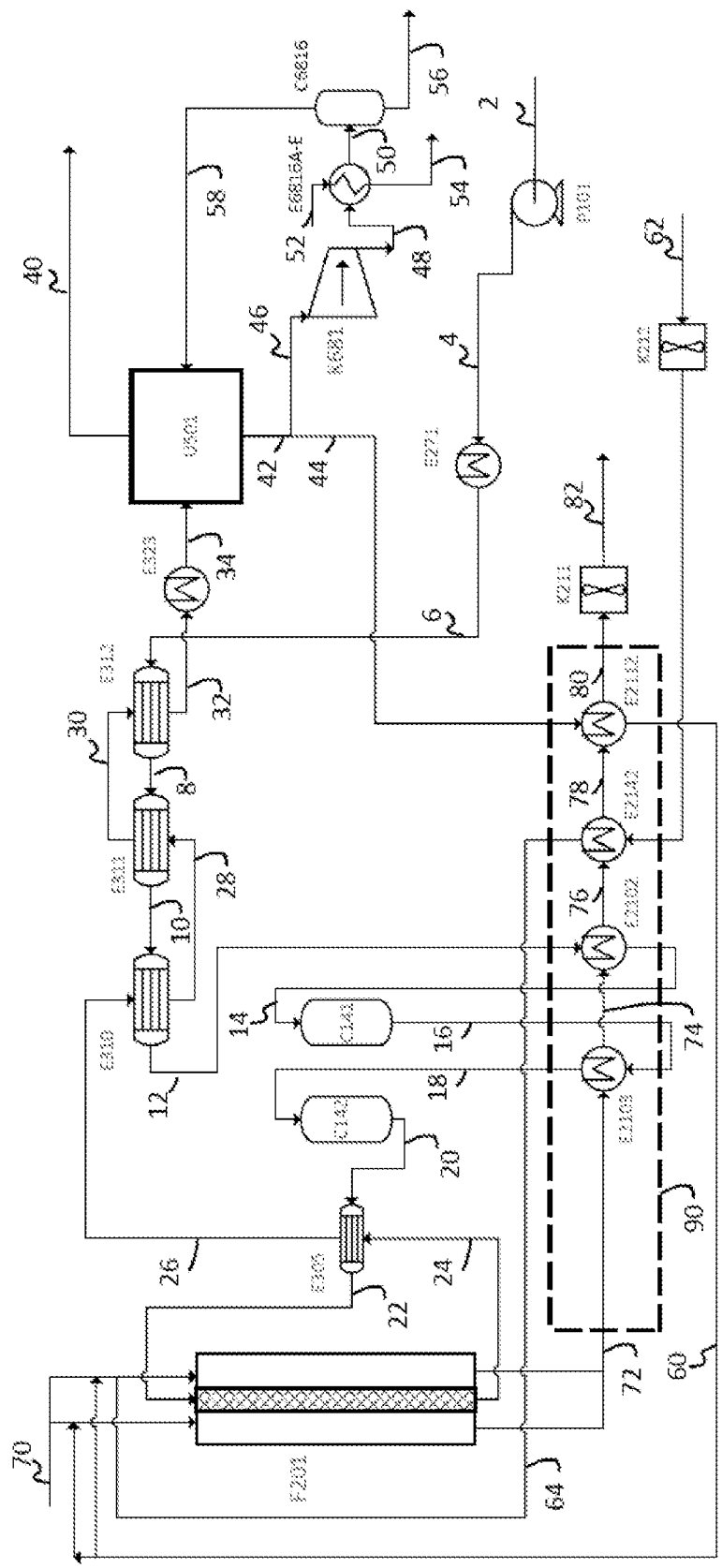
FIG. 1 is a simplified flowsheet for an ammonia cracking process in which the present invention is incorporated.

Amounts of components given in parts per million (or ppm) are calculated by weight unless otherwise stated. In addition, all percentages are calculated by mole unless otherwise stated. Moreover, any references to pressure are references to absolute pressure unless otherwise stated.

In the context of the present invention, the activity of a catalyst will be understood to refer to the rate of conversion of ammonia at a given partial pressure for a given amount of catalyst over a given period of time at a particular temperature and overall pressure. The units used to define the activity of a heterogeneous catalyst are mole of ammonia converted per gram of catalyst (including substrate if present) per second (or mol. $g^{-1}$ $s^{-1}$).

The expression "in fluid flow communication" will be understood to mean that piping or other suitable conduits will be used to convey fluid from one specified location to another. During passage between the two locations, the fluid may flow through one or more other units which may be designed and/or arranged to alter the physical condition, e.g., temperature (e.g., a heat exchanger) and/or pressure (e.g., a compressor or a pump) of the fluid, or the composition of the fluid through reaction of components within the fluid (e.g., a catalytic reactor). The expression "in direct fluid flow communication" will be understood to mean that the fluid flows directly from the one location to the other, i.e., does not flow through another such unit during its passage and hence there is essentially no change to the composition or physical condition of the fluid.

The term "super-atmospheric pressure" will be understood to mean a pressure that is significantly higher than atmospheric pressure, such as a pressure of at least 5 bar, e.g., a pressure of at least 10 bar, or of at least 20 bar or of at least 30 bar. Typically, the pressure is no more than 60 bar.

The term "upstream" will be understood to mean in the opposite direction to the flow of fluid during normal operation. The term "downstream" will be interpreted accordingly.

Liquid ammonia may be supplied at ambient pressure from either a pipeline or, more typically, a refrigerated storage tank. Water is often added to ammonia to prevent stress corrosion cracking in the storage tanks, trucks and ships used to transport ammonia. The presence of water in the feed ammonia turns the feed into a multi-component stream, and the evaporation of the feed stream would then require a higher temperature to achieve complete evaporation.

A typical composition of the ammonia feed is shown in Table 1.

TABLE 1

| Component | Composition |
|---|---|
| Ammonia | 99.5-99.8 wt % |
| Maximum water content | 0.5 wt % |
| Minimum water content | 0.2 wt % |
| Oil | 5 ppm max |
| Inerts (e.g., Ar) | <10 ppm |
| Iron | <1 ppm |

Oil may be present in the ammonia due to a boil-off gas compressor used for the ammonia storage, either at the local storage tank, production location, or any other storage tank in between. The presence of oil is an issue because it presents a blockage and/or contamination risk. This may lead to malperformance in the heat exchangers or reduced catalyst activity in the reactors. Therefore, if present, the oil may need to be removed in some way. In this regard, the oil can be removed by passing the liquid ammonia through a bed of activated carbon. However, in preferred embodiments, the catalyst used in the adiabatic reaction unit will crack the oil into shorter chain hydrocarbons which may react with any water present to form carbon monoxide, hydrogen, and methane.

Inert gases are not expected to be an issue, other than they could end up in the product hydrogen. In this regard, helium can be present in ammonia derived from natural gas but ammonia from renewable hydrogen will not contain helium.

The liquid ammonia is typically taken from storage and pumped from the storage pressure (e.g., about 1 bar) to a pressure in a range from about 5 bar to about 60 bar, e.g., from about 10 bar to about 50 bar such as from about 10 bar to about 30 bar or from about 40 bar to about 50 bar. The temperature of the liquid ammonia increases slightly from the storage temperature (e.g., about −34° C.) to about −32° C. If liquid ammonia is taken from a pipeline, the temperature of the liquid ammonia is usually higher, e.g., about +10° C.

The pumped liquid ammonia (at super-atmospheric pressure) is then pre-heated to its boiling point, ideally by appropriate heat integration within the process. Part of the pre-heating is achieved using a heat transfer fluid circuit where the heat from the PSA off gas compressor, e.g., from the intercooling and aftercooling of a PSA offgas compressor, is recovered using a heat transfer fluid such as an aqueous solution of a glycol, e.g., an aqueous solution comprising from about 50 wt. % to about 60 wt. % of a glycol such as ethylene glycol or propylene glycol, optionally together with heat from the flue gas and/or the cracked gas, and used to preheat the liquid ammonia. If no such integration is possible, such as if the compressor is not running, then heat from an external source, such as an electric heater, is typically used preheat the ammonia.

The pre-heated liquid ammonia is then evaporated, and the ammonia gas heated further prior to being fed to catalyst-containing reactor tubes or to an adiabatic reaction unit. In this regard, the ammonia gas is superheated, i.e., heated to a temperature above its boiling point, to a temperature of more than 350° C. to ensure a useful rate of reaction in the catalyst-containing reactor tubes or the adiabatic reaction unit.

The duty for the evaporation and further heating of the pre-heated liquid ammonia may be provided by heat exchange with the cracked gas, the flue gas or a combination of both the cracked gas and the flue gas. In preferred embodiments, the cracked gas is used to heat and evaporate the pre-heated liquid ammonia by heat exchange and then the ammonia gas is further heated by heat exchange with the flue gas.

The heated ammonia gas may be fed directly to the catalyst-containing reactor tubes, i.e., without first partially cracking some of the ammonia.

The reactor tubes of the furnace are filled with at least one ammonia cracking catalyst. A large number of metals are known in the art to catalyze the cracking of ammonia. These metals include transition metals such those in Group 6 of the Periodic Table, e.g., chromium (Cr) and molybdenum (Mo); Group 8, e.g., iron (Fe), ruthenium (Ru) and osmium (Os); Group 9, e.g., cobalt (Co), rhodium (Rh) and iridium (Ir); Group 10, e.g., nickel (Ni), palladium (Pd) and platinum (Pt); and Group 11, e.g., copper (Cu), silver (Ag) and gold (Au). Metalloids such as tellurium (Te) may also be used.

The activity of some of these metals as catalysts for ammonia cracking has been reported by Masel et al (Catalyst Letters, vol. 96, Nos 3-4, July 2004) to vary in the following order:

The metals may be unsupported but are usually supported on a suitable support, typically a metal oxide support such as silica ($SiO_2$), alumina ($Al_2O_3$), zirconia ($ZrO_2$) or a mixed metal oxide support such as spinel ($MgAl_2O_4$) or perovskite ($CaTiO_3$). Alternatively, the metal(s) may be supported on a zeolite.

As would be understood by the skilled person, the activity of a supported metal catalyst will typically depend in part on the loading of the catalytically active metal on the support. In this regard, the loading of the metal will vary according to the specific requirements but will typically be in a range from about 0.1 wt % to about 70 wt %. The loading may be towards the lower end of the range, e.g., from about 0.1 wt % to about 10 wt % or from about 0.2 wt % to about 5 wt %, for the more active metals, e.g., ruthenium. For less active metals, e.g., nickel, the loading may be towards the upper end of the range, e.g., from about 20 wt % to about 65 wt %.

Supported metal catalysts may be unpromoted or may be promoted with at least one other metal, e.g., one or more Group 1 metals, e.g., lithium (Li), sodium (Na) and potassium (K); Group 2 metals, e.g., magnesium (Mg) and calcium (Ca), or Group 13 metals, e.g., aluminum (Al), to improve activity as is well known in the art.

Any conventional catalysts known for ammonia cracking may be used in the present invention. Suitable catalysts are disclosed in US2015/0217278A, Masel et al (above), Lamb et al (Int. J. Hydrogen Energy, 44 (2019) pp 3726-3736) and Boisen et al (J. Catalysis 230 (2005) pp 309-312).

Bimetallic catalysts, or catalysts containing two catalytically active metals, are also suitable for use with the present invention. Examples include the composite metal or metal alloys or metal nanoclusters supported on perovskites, composite oxides or nitrides, or mixed oxides or mixed nitrides disclosed in US2021/0001311A such as CoNi—MgSrCeO$_4$ and 1 wt % K—CoNi—MgSrCeO$_4$.

The catalyst(s) of the present invention typically comprise(s), e.g., contain(s) or consist(s) of, at least one metal-based catalyst. The catalytically active metal is typically selected from the transitional metals of the Periodic Table. Suitable transition metal-based catalysts have an activity at a temperature in the range of 475° C. to 600° C. suitable to achieve a reaction rate of at least 0.2 times, or at least 0.5 times, or at least equal to, or at least twice, or at least five times, the rate calculated according to equation 9 proposed by Lamb et al, i.e., $$r = 8.73 \exp[76710/RT] \cdot (P_{NH3})^{0.28} \cdot (P_{H2})^{-0.42} \cdot (1-\beta^2)$$

where:
"r" is the reaction rate (or "activity") of the catalyst;
"RT" is the ideal gas constant "R" (8.314 J mol$^{-1}$ K$^{-1}$) multiplied by the temperature "T" in Kelvin;
$P_{NH3}$ is the partial pressure of ammonia;
$P_{H2}$ is the partial pressure of hydrogen;
$\beta$ is define in the paper (see equation 5 proposed by Lamb et al) as $$\beta = \frac{1}{K_e}\left(\frac{P_{N_2}^{0.5} P_{H_2}^{1.5}}{P_{NH_3}}\right)$$

$P_{N2}$ is the partial pressure of nitrogen; and
$K_e$ is the equilibrium constant for the reaction (see equations 6 & 7 proposed by Lamb et al).

The Inventors have realized that equation 9 of Lamb et al may be extrapolated to temperatures outside 475° C. to 600° C., e.g., in the range from 450° C. to 700° C.

Transition metals that may be particularly suitable for use as the predominant catalytically active metal(s) of the catalyst(s) in the catalyst bed of the reactor tubes are selected from chromium, manganese, iron, cobalt, nickel, ruthenium and copper, e.g., iron, cobalt, nickel and ruthenium. The Inventors understand that nickel and ruthenium are typically the most suitable metals for use in this regard.

In some embodiments, the reactor tubes of the furnace are filled only with a single ammonia cracking catalyst, e.g., a nickel-based catalyst.

In other embodiments, the reactor tubes are filled with at least two different ammonia cracking catalysts having different activities. In these embodiments, a more active catalyst, e.g., a ruthenium-based catalyst, may be located downstream of a less active catalyst, e.g., a nickel-based catalyst, to ensure that the cracking reaction approaches equilibrium. Alternatively, the more active catalyst may be located upstream of a less active catalyst to help control the inner wall temperature of the reactor tubes in the region where the temperature and partial pressure of ammonia is highest, thereby controlling nitriding of the tubes. In these alternate embodiments, a second more active catalyst, e.g., another ruthenium-based catalyst, may be located downstream of the less active catalyst to ensure that the cracking reaction approaches equilibrium.

The activity of the more active catalyst is typically at least 50% greater than that of the less active catalyst. However, the difference in relative activities is usually substantially more than 50%. In this regard, the activity of the more active catalyst is usually greater than the activity of the less active catalyst by a factor of at least two (i.e., double), or at least three, or at least four, or at least five. In some embodiments, the activity of the more active catalyst is greater than the activity of the less active catalyst by a factor of at least ten (i.e., by one order of magnitude) or by a factor of at least fifteen.

In some preferred embodiments, the catalyst in the upstream layer is a ruthenium-based catalyst and the catalyst in the downstream layer is a nickel-based catalyst. Where a third catalyst is present in these embodiments downstream of the nickel-based catalyst, that catalyst is preferably a ruthenium-based catalyst although the catalyst may be a different ruthenium-based catalyst to the first catalyst, e.g., the catalyst has a different support and/or catalyst loading and/or, if both are promoted, then promoted with a different metal.

Thus, the term "ruthenium-based catalyst" refers to a catalyst containing ruthenium as the sole (or at least predominant) catalytically active metal, i.e., the metal responsible for catalyzing the cracking reaction. Ruthenium may be the only metal in the catalyst or alternatively one or more other metals may be present, e.g., in a material supporting the ruthenium. The terms "nickel-based catalyst" and "iron-based catalyst" are intended to be interpreted accordingly.

Suitable ruthenium-based catalysts and nickel-based catalysts may be supported, for example, on alumina (as disclosed in Lamb et al or Masel et al) or spinel (as disclosed in Boisen et al), optionally promoted with a Group 1 or Group 2 metal.

As mentioned above, water is usually present in the ammonia as a contaminant. The water may be removed from the ammonia in which case catalysts which do not tolerate water, e.g., iron-based catalysts, may be used in the reactor tubes. However, water is not removed in preferred embodiments to save capital and operational costs and to reduce energy consumption. In these embodiments, catalysts that cannot tolerate water, e.g., iron-based catalysts, are not typically used. Instead, the catalysts in the reactor tubes would be able to tolerate up to 1 mol. % water in the ammonia feed. Such catalysts include nickel-based and ruthenium-based catalysts.

In some preferred embodiments, a ruthenium-based catalyst is used in the first layer within each tube so that the faster reaction rate allows the metals temperature to be kept to within the design limit of 660° C. In these embodiments, the second layer of the tubes contains a lower cost but less active nickel-based catalyst. The catalysts are layered in this way to use the endotherm of reaction inside the tubes to keep the tube metal cool in the region where the combustion is most intense on the outside of the tubes. Since ruthenium is more catalytically active it creates a stronger endotherm that keeps the inner tube wall cooler in the region of high ammonia concentration on the process side which protects the tubes from excessive nitriding caused by high ammonia concentration and high temperatures.

The combustion process in the furnace is preferably at least partially internally fueled, i.e., at least part of the fuel is either ammonia or an off gas generated during recovery of hydrogen from the cracked gas or a mixture of the two. However, a trim fuel such as $C_1$ to $C_3$ hydrocarbons or natural gas may be used as required although using a hydrocarbon trim fuel will increase the carbon intensity of the process. It is generally desirable, however, to minimize, or even eliminate, the use of such a trim fuel to reduce the carbon intensity of the process.

The oxidant gas is typically air but may be an oxygen-enriched gas or pure oxygen as appropriate.

The feed to the catalyst-filled reactor tubes of the furnace may be at a temperature up to about 800° C. provided the material of the reactor walls can withstand the higher temperatures. For lower temperature cycles, the feed is typically at a temperature in a range from about 400° C. to about 600° C., or from about 450° C. to about 550° C., e.g., at about 500°. For higher temperature cycles, the feed may be at a temperature in the range of about 500° C. to about 800° C., or from about 600° C. to about 700° C., e.g., at about 650°.

The cracking temperature and pressure typically dictate that the ammonia slip in the reactor tubes is no more than 3 mol. %, e.g., from about 0.5 mol. % to about 1.5 mol. %.

In some embodiments, the heated ammonia gas is partially cracked in an adiabatic reaction unit comprising at least one catalyst bed to produce partially cracked ammonia gas for feeding to the catalyst-filled reactor tubes.

The mole fraction of ammonia in the gas passing through the adiabatic reaction unit is typically reduced by at least 20%, e.g., by at least 25%, or by at least 30%, or even by at least 35%, e.g., by about 40%, and potentially up to about 50%. Put another way, the mole fraction of ammonia may be reduced from 1 (or almost 1) in the heated ammonia gas to an amount in a range from about 0.5 to about 0.8, or to an amount in a range from about 0.5 to about 0.7, or to an amount in a range from about 0.55 to about 0.65, e.g., to about 0.6, in the partially cracked ammonia gas.

The adiabatic reaction unit may be incorporated into the design of the process to improve overall efficiency, specifically by using the heat available in the flue gas to provide heat to the adiabatic cracking process within this unit. In this regard, the temperatures around the adiabatic reaction unit are typically optimized to maximise the recovery of heat from the flue gas, often avoiding temperatures greater than about 660° C. because of concerns regarding the materials.

The key design parameter for the adiabatic reaction unit is the inlet temperature. A higher inlet temperature allows greater conversion in the unit since the ammonia cracking reaction is endothermic. However, higher temperatures put greater demands on the materials of construction and the catalyst. The inlet temperature is typically in a range from about 350° C. to about 800° C. and, for lower temperature cycles, may be in a range from about 400° C. to about 600° C., or from about 400° C. to about 450° C. For higher temperature cycles, the inlet temperature may be in a range from about 500° C. to about 700° C., or from about 550° C. to about 650° C.

Due to the high temperature and ammonia concentration, the cracking reactor vessels, e.g., the adiabatic reactors and the reactor tubes in furnace, must typically be constructed from materials resistant to ammonia and/or nitriding. Suitable materials include nickel-based alloys comprising at least 40 wt. % or at least 50 wt. % nickel. Such alloys typically have no more than 90 wt. %, or no more than 80 wt. % nickel. The alloys will typically comprise one or more other metals selected from chromium, cobalt, molybdenum and iron.

Specific examples of suitable nickel-based alloys include UNS N06600, N06625, N06601, N06617, N06025, N06230, N07214, N08811. In some embodiments, austenitic nickel-chromium based superalloys such as Inconel may be used.

The unified numbering system (UNS) is an alloy designation system that is widely accepted in North America. Each UNS number relates to a specific metal or alloy and defines its specific chemical composition, or in some cases a specific mechanical or physical property.

Other suitable materials include cobalt-based alloys such as UNS R30188. In addition, high temperature alloys that are less resistant to ammonia nitriding, such as UNS N08811 or cast alloys such as HPNb, HP Micro-Alloyed, MA-1 (MetalTek International, USA), may be suitable, particularly when surface modified or coated by a corrosion resistant layer such as aluminization; aluminization and then pre-oxidation; or a ceramics coating. Nitriding resistant alloys can also be used with surface modification or coating for improved performance.

The adiabatic reaction unit will typically comprise one or more adiabatic reactors, the or each reactor comprising a catalyst bed. The or each adiabatic reactor may be made from one or more of the ammonia-resistant and/or ammonia nitriding-resistant materials list above.

In preferred embodiments, the adiabatic reaction unit will comprise one or more adiabatic reactors, e.g., two, three, four, five or six reactors, with interstage heating as appropriate. The reactors may be arranged in series or in parallel or in a combination of series and parallel depending on the requirements of the process. However, in preferred embodiments, the adiabatic reaction unit will have two such reactors arranged in series with interstage heating of the intermediate partially cracked ammonia gas by heat exchange against the cracked gas and/or the flue gas.

Each adiabatic reactor has a bed comprising at least one catalyst suitable for cracking ammonia. Any conventional ammonia cracking catalyst may be used in the bed of the or each adiabatic reactor. Suitable catalysts are discussed above in the context of the catalysts for the reactor tubes.

In embodiments where water is removed from the ammonia prior to cracking, catalysts that are not tolerant to water, e.g., iron-based catalysts, may be used in the adiabatic reactor(s). However, water is not removed in preferred embodiments to save capital and operational costs and to reduce energy consumption. In these embodiments, the catalyst beds of the adiabatic reaction unit contain no iron-based catalyst and, instead, the use of water tolerant catalysts, i.e., metal-based catalysts that are tolerant to the presence of up to 1 mol. % water, are preferred. In this regard, either nickel-based catalysts or ruthenium-based catalysts, or a combination of nickel-based catalysts and ruthenium-based catalysts may be used in the bed(s) of the adiabatic reactor unit.

As mentioned above, ruthenium-based catalysts tend to be more active than nickel-based catalysts but are more expensive. Therefore, further optimization is possible by selection of the catalyst and, if more than one type of catalyst is used, by the ordering of layers of the catalysts within the bed(s) of the adiabatic reaction unit.

In some embodiments having two adiabatic reactors in series, the catalyst bed of the first reactor comprises, e.g., contains or consists of, a single layer of a first catalyst, e.g., a ruthenium-based catalyst, and the catalyst bed of the second reactor comprises, e.g., contains or consists of, an upstream layer of a second catalyst, e.g., a nickel-based catalyst, that is typically less active that then first catalyst, and a downstream layer of a third catalyst, e.g., a ruthenium-based catalyst, that is typically more active than the second catalyst.

In these embodiments, the first and third catalysts may be identical. Alternatively, the first and third catalysts may be different, e.g., contain different catalytically active metals or contain the same catalytically active metals but on different supports or contain the same catalytically active metals on the same supports but at different loadings.

In other embodiments having two adiabatic reactors in series, the catalyst bed of the first reactor comprises, e.g., contains or consists of, a single layer of a first catalyst, e.g., a nickel-based catalyst, and the catalyst bed of the second reactor comprises, e.g., contains or consists of, an upstream layer of a second catalyst, e.g., a nickel-based catalyst, that typically has a similar activity to the first catalyst, and a downstream layer of a third catalyst, e.g., a ruthenium-based catalyst, that is typically more active than the first and second catalysts.

In these embodiments, the first and second catalysts may be identical. Alternatively, the first and second catalysts may be different, e.g., contain different catalytically active metals or contain the same catalytically active metals but on different supports or contain the same catalytically active metals on the same supports but at different loadings.

In both sets of preferred embodiments, the volume of the upstream layer of the second catalyst in the bed of the second reactor may be from about 40% to about 90%, e.g., from about 50% to about 70% or about 60%, of the total volume of the bed. In the absence of another layer of catalyst, the volume of the downstream layer of the third catalyst in the bed of the second reactor may be from about 10% to about 60%, e.g., from about 30% to about 50%, or about 40%, of the total volume of the bed.

In other embodiments, however, the bed of the or each adiabatic reactor contains a nickel-based catalyst which may or may not be identical to the catalyst used in the reactor tubes.

The Inventors have realized that ruthenium-based catalysts are not only sufficiently tolerant to water but are also capable of cracking hydrocarbon oils into shorter hydrocarbons such as methane, together with carbon monoxide and hydrogen. Therefore, the use of these catalysts in the adiabatic reaction unit can eliminate the need for a dedicated unit upstream for removing the oil from the liquid ammonia.

It is also known that at higher temperatures, catalyst sintering reduces the activity and life of the catalyst. In this regard, the skilled person would be aware of the need to balance the improved conversion against the higher vessel costs and shorter catalyst life.

The heat from the cracked gas and the flue gas is typically used to heat the feed streams to the adiabatic reaction unit and furnace, thereby reducing the overall energy consumed by the process. In this regard, the temperature of the cracked gas will depend on the cycle being operated.

In lower temperature cycles, the temperature of the cracked gas may be up to about 700° C., e.g., typically from about 550° C. to about 700° C., or from about 600° C. to about 650° C. The temperature of the flue gas may be up to about 750° C. at its highest point. However, the temperature drops due to heat leak and is typically from about 600° C. to about 700° C. at the point where its heat can be utilized effectively.

In higher temperature cycles, the temperature of the cracked gas may be up to about 750° C., e.g., typically from about 650° C. to about 750° C., or from about 675° C. to about 725° C. The temperature of the flue gas may be up to about 840° C. at its highest point. However, the temperature drops due to heat leak and is typically from about 700° C. to about 800° C. at the point where its heat can be utilized effectively.

Where an adiabatic reaction unit is used to partially crack the heated ammonia gas and the partially cracked gas is heated to the feed temperature of the catalyst-filled reactor tubes of the furnace, at least some of the duty required to heat the partially cracked gas is provided by heat exchange with the cracked gas. In preferred embodiments, the cracked gas is not used to heat another process fluid before heating the partially cracked gas. Some of this heating duty may be provided in another way, e.g., by heat exchange with the flue gas. However, all of this heating duty is preferably provided by the cracked gas.

In preferred embodiments, the composition of the ammonia is typically at least substantially unchanged from the liquid ammonia in storage to the heated ammonia gas being fed to the adiabatic reaction unit. Oil present in the liquid ammonia may be removed at some point prior to partial cracking of the ammonia although, where ruthenium-based catalysts are used, the oil does not need to be removed. However, water is not typically removed so any water present in the liquid ammonia will also be present in heated ammonia gas.

Where the partially cracked gas is heated by heat exchange with the cracked gas, the temperature of the cracked gas is reduced. The cracked gas is then typically further cooled by providing at least part of the heating duty required to generate the heated ammonia gas from liquid ammonia.

After cooling, hydrogen may be recovered as product from the cracked gas. Recovery is achieved in a pressure swing adsorption (PSA) process, optionally together with one or more selectively permeable membranes.

A PSA off gas comprising nitrogen gas, residual ammonia and residual hydrogen is generated in the PSA process. The PSA off gas is split into two portions. A first portion of the PSA off gas is compressed in a compression unit and recycled to the PSA process to improve hydrogen recovery. The second portion is typically pre-heated and then fed as fuel to the furnace.

However, during certain periods, such as when the off gas compressor is offline for repair or servicing, or it has been determined that the plant should operate with a lower Carbon Intensity, so requiring a lower PSA recovery to increase the hydrogen in the PSA off gas going to the burners to allow a reduction in the natural gas used by the plant, the compressor may not be in operation or only operating at part load. During these periods, the "missing" part of the duty required to warm the heat transfer fluid is typically provided from an external source, such as an electrical heater.

The compression unit is typically a multistage compression unit with intercooling and aftercooling using the heat transfer fluid. Thus, the heat transfer fluid flows through the or each intercooler removing heat of compression from the PSA off gas being compressed, and through the aftercooler removing heat of compression from the compressed PSA off gas.

The compression unit also typically comprises one or more auxiliary coolers including a lube oil cooler and, for positive displacement compressors, coolers for cylinder cooling. In such embodiments, the heat transfer fluid may also flow through the auxiliary cooler(s) to provide lube oil cooling duty and/or cylinder cooling duty. The auxiliary cooling duty may be 10 to 30%, e.g., 20 to 25%, of the total cooling duty required by the compression unit.

The heat transfer fluid may also be used to help cool the cracked gas prior to hydrogen recovery. In this regard, after the cracked gas has provided its share of the duty to heat and vaporize the ammonia feed, the cracked gas is cooled further by heat exchange with the heat exchange fluid in a cracked gas heat exchanger to produce a cooled cracked gas ready for hydrogen recovery in the PSA system.

The heat exchange fluid used to cool the compression unit and cracked gas is then typically cooled before being returned to the compression unit and the cracked gas heat exchanger. Cooling is achieved in part by heat exchange with the liquid ammonia. The remaining part of the cooling duty is provided with by an air cooler or by heat exchange with a liquid coolant such as water. The cooled heat exchange fluid is then typically returned to the compression unit and the cracked gas heat exchanger.

The heat exchange fluid typically therefore circulates around a circuit, or "closed loop" which would usually include a pump for moving the fluid around the circuit and may comprise a storage tank for the heat exchange fluid. Excess heat may be removed from the heat transfer fluid using at least one water cooler and/or air cooler as part of the circuit.

Aspects of the present invention include:
1. A process for cracking ammonia comprising:
  warming heat transfer fluid to produce a warmed heat transfer fluid;
  pumping liquid ammonia to produce a pumped liquid ammonia;
  pre-heating the pumped liquid ammonia produce a pre-heated liquid ammonia;
  vaporizing the pre-heated liquid ammonia to produce an ammonia gas;
  heating the ammonia gas to produce a heated ammonia gas;
  combusting a fuel with an oxidant gas in a furnace to heat catalyst-containing reactor tubes and produce a flue gas;
  feeding the heated ammonia gas, or a partially cracked ammonia gas derived therefrom, to the catalyst-containing reactor tubes to cause cracking of ammonia and produce a cracked gas comprising hydrogen gas, nitrogen gas and residual ammonia gas;
  cooling the cracked gas to produced cooled cracked gas; and
  recovering hydrogen gas from the cooled cracked gas in a pressure swing adsorption (PSA) unit to produce a hydrogen gas as product and PSA off gas comprising nitrogen gas, residual hydrogen gas and residual ammonia gas,
  wherein a portion, e.g., up to about 55%, of the PSA off gas is compressed in a compression unit to produce compressed PSA off gas which is recycled to the PSA unit and at least part, e.g., up to about 95%, of the duty required to warm the heat transfer fluid is provided by using the heat transfer fluid to cool the compression unit, and
  wherein a part, e.g., up to about 80%, of the duty required to pre-heat the pumped liquid ammonia is provided by heat exchange with the warmed heat transfer fluid.

In embodiments involving about 95% hydrogen recovery, the portion of the PSA off gas that is compressed in the compression unit may be in a range from about 40% to about 50%, e.g., about 46%, and the part of the duty required to warm the heat transfer fluid that is provided by using the heat transfer fluid to cool the compression unit may be in a range from about 80% to about 90%, e.g., about 87%. These figures are lower for embodiments in which the hydrogen recovery is lower as PSA off gas is diverted away from the compression unit to the burner(s) of the furnace in those embodiments.

In embodiments in which the liquid ammonia is taken from storage, the part of the duty required to pre-heat the pumped liquid ammonia that is provided by heat exchange with the warmed heat transfer fluid may be in a range from about 70% to about 80%, e.g., about 75%. However, liquid ammonia is typically stored at a temperature of $-34°$ C. The figure is less for embodiments where the liquid ammonia is taken from a pipeline as the temperature of the liquid ammonia in this case is generally higher, e.g., about $+10°$ C., and so less pre-heating is required.

2. A process according to #1 wherein the liquid ammonia is pumped from a storage vessel.
3. A process according to #1 or #2 wherein the majority, e.g., up to about 85%, of the duty required to cool the compression unit is the duty required to remove heat of compression from the PSA off gas. The remainder of the duty required to cool the compression unit is the auxiliary cooling duty, e.g., the lube oil cooling duty and, for positive displacement compressors, the cylinder cooling duty.
4. A process according to any of #1 to #3 wherein the compressed PSA off gas is at or above its dew point temperature.
5. A process according to any of #1 to #4 wherein, during periods when the compression unit is operating at part load or not operating at all, the duty required to warm the heat transfer fluid is replaced by an external source.
6. A process according to #5 wherein the external source is an electrical heater.
7. A process according to any of #1 to #6 wherein any remaining part of the duty required to warm the heat transfer fluid is provided by heat exchange with cracked gas and/or flue gas.
8. A process according to any of #1 to #7 wherein excess heat is removed from the heat transfer fluid using air coolers and/or cooling water.

9. A process according to #1 wherein the heat transfer fluid is pumped around a circuit.
10. A process according to any of #1 to #9, wherein the heat transfer fluid is an aqueous solution of a glycol.
11. A process according to #10, wherein the aqueous solution comprises from about 50 wt. % to about 60 wt. %, e.g., about 55 wt. %, glycol.
12. A process according to #10 or #11, wherein the glycol is selected from the group consisting of ethylene glycol and propylene glycol.
13. A process according to any of #1 to #12, wherein warmed heat transfer fluid is at a temperature that is over 60° C., usually no more than about 80° C., e.g., at a temperature of about 65° C.
14. A process according to any of #1 to #13, wherein a further portion, e.g., the remaining portion, of PSA off gas is pre-heated and fed as fuel to the furnace.

The portion of the total fuel requirement of the furnace provided by the PSA off gas will vary depending on the extent to which hydrogen is recovered in the PSA unit. For example, where the hydrogen recovery is about 95%, the PSA off gas may only account for about 30% to about 40%, e.g., about 34%, of the total fuel requirement. The proportion will increase as hydrogen recovery decreases as the PSA off gas sent to the burner(s) in the furnace will then contain more hydrogen. For example, in embodiments where the hydrogen recovery is about 85%, the PSA off gas may account for about 60% to 70%, e.g., about 66%, of the total fuel requirement.

15. A process according to any of #1 to #14 comprising partially cracking the heated ammonia gas in an adiabatic reaction unit comprising at least one catalyst bed to produce the partially cracked ammonia gas for feeding to the catalyst-filled reactor tubes.
16. Apparatus for cracking ammonia at super-atmospheric pressure comprising:
  a source of liquid ammonia;
  a pump comprising an inlet in fluid flow communication with the source of liquid ammonia and an outlet for pumped liquid ammonia;
  a furnace comprising:
    a radiant section comprising at least one inlet for fuel and oxidant gas in fluid flow communication with at least one burner, an ammonia feed inlet in fluid flow communication with the pump, and catalyst-filled reactor tubes having upstream ends in fluid flow communication with the ammonia feed inlet and downstream ends in fluid flow communication with an outlet for cracked gas, and
    a convection section in fluid flow communication with the radiant section comprising an outlet for flue gas,
  a PSA unit comprising an inlet in fluid flow communication with the outlet for cracked gas in the radiant section of the furnace, an outlet for hydrogen gas and an outlet for PSA off gas;
  a compression unit comprising an inlet in fluid flow communication with the outlet for PSA off gas in the PSA unit, and an outlet for compressed PSA off gas in fluid flow communication with the inlet of the PSA unit,
  wherein the apparatus further comprises:
    one or more coolers located within the compression unit and arranged for cooling the compression unit by heat exchange against a heat transfer fluid;
    a pre-heating unit located downstream of the pump and arranged for pre-heating pumped liquid ammonia by heat exchange against the heat transfer fluid; and
    at least one heat exchanger located upstream of the ammonia feed inlet of the furnace for vaporizing pre-heated liquid ammonia and heating ammonia gas by heat exchange with the cracked gas.

The "coolers" within the compression unit include intercoolers, aftercoolers and coolers responsible for auxiliary cooling, e.g., lube oil cooling and/or cylinder cooling.

17 An apparatus according to #16 wherein the source of liquid ammonia is a storage vessel.
18. An apparatus according to #16 or #17 comprising an external heater for warming the heat transfer fluid.
19. An apparatus according to #18 wherein the external heater is an electrical heater.
20. An apparatus according to any of #16 to #19 comprising at least one heat exchanger arranged to warm the heat transfer fluid by heat exchange against cracked gas and/or flue gas.
21. An apparatus according to any of #16 to #20 comprising at least one air cooler and/or at least one water cooler arranged to cool the heat transfer fluid.
22. An apparatus according to any of #16 to #21 comprising a circuit for the heat transfer fluid, said circuit comprising a pump for moving the heat transfer fluid around the circuit.
23. An apparatus according to any of #16 to #22 wherein the outlet for PSA off gas in the PSA unit is in fluid flow communication with said at least one inlet for fuel and oxidant gas in the radiant section of the furnace and the apparatus comprises at least one heat exchanger located upstream of said at least one inlet for fuel and oxidant gas and arranged for pre-heating the PSA off gas by heat exchange, e.g., against cracked gas and/or flue gas.
24. An apparatus according to any of #16 to #23 comprising an adiabatic reaction unit for partially cracking heated ammonia gas, the unit comprising an inlet for heated ammonia gas in fluid communication with the pump, at least one catalyst bed having an upstream end in fluid communication with the inlet and a downstream end in fluid communication with an outlet for partially cracked ammonia gas,
  wherein the outlet for partially cracked ammonia gas is in fluid flow communication with the ammonia feed inlet of the furnace.

The invention will now be described by way of example only with reference to the figures.

In FIG. 1, a stream 2 of liquid ammonia at about −32° C. is removed from storage (not shown) and fed to a pump P101 where it is pumped to produce a stream 4 of pressurised liquid ammonia at a pressure of about 46 bar which is pre-heated by heat exchange with a heat transfer fluid which in this case is an aqueous solution of a glycol, typically about 55 wt. % ethylene glycol or propylene glycol, in heat exchanger E271 to produce stream 6 of pre-heated liquid ammonia at about 55° C. An electric heater may be used to ensure that the temperature of the glycol solution being fed to the heat exchanger E271 is sufficient to pre-heat the liquid ammonia to the required temperature.

The pre-heated liquid ammonia in stream 6 is further heated by heat exchange in heat exchanger E312 to produce a stream 8 of further heated liquid ammonia. The further heated liquid ammonia in stream 8 is then evaporated by heat exchange in heat exchanger E311 to produce a stream 10 of ammonia vapor. The ammonia vapor in stream 8 is then superheated by heat exchange in heat exchanger E310 to produce a stream 12 of heated ammonia gas at about 260° C.

The heated ammonia gas in stream 12 is further heated by heat exchange in heat exchanger E2102 to produce a stream 14 of superheated ammonia gas at about 420° C. For convenience, heat exchanger E2102 is indicated as a single unit. However, there may be in reality two separate heat exchangers with a selective catalytic reactor (SCR) located in between.

The superheated ammonia gas in stream 14 is fed at about 420° C. and about 43 bar to a first adiabatic reactor vessel C141 and passed through a bed of ruthenium-based catalyst. Some of the ammonia gas is cracked over the catalyst to form a stream 16 of intermediate gas that contains some cracked ammonia. The mole fraction of ammonia in the gas passing through the first adiabatic reactor vessel C141 drops from almost 1 to about 0.9.

The intermediate gas is at about 360° C. before being heated by heat exchange in heat exchanger E2103 to produce a stream 18 of superheated intermediate gas which is then fed at about 590° C. to a second adiabatic reactor vessel C142 and passed through a bed containing an upstream layer of nickel-based catalyst and a downstream layer of a ruthenium-based catalyst to produce a stream 20 of partially cracked ammonia gas. The mole fraction of ammonia in the gas passing through the second adiabatic reactor vessel C142 drops from about 0.9 to about 0.6.

The catalyst bed of the second adiabatic reactor vessel C142 has two layers with a layer of nickel-based catalyst over a layer of ruthenium-based catalyst to use the heat more efficiently and hence maximize ammonia conversion. The catalyst volumes are also optimized, i.e., minimizing the volume of the ruthenium-based catalyst by limiting the exit temperature of the second adiabatic reactor vessel to about 390° C. The Inventors found that reducing this temperature any further increases the volume required of the ruthenium-based catalyst.

The ruthenium-based catalyst is the same in both the first and second adiabatic reactor vessels. However, different ruthenium-based catalysts may be used.

The partially cracked ammonia in stream 20 is heated by heat exchange in a heat exchanger (or "economizer") E305 prior to being fed as stream 22 at a pressure of about 38 bar to catalyst-filled tubes in the radiant section F201 of a furnace (or reactor). Heating the feed to the tubes increases the amount of cracking that can be done with the heat from the burners by reducing the duty required to heat the partially cracked stream to the reaction temperature. Utilizing the cracked stream from the tubes allows efficient use of this high temperature stream. The inlet temperature of the direct fired tube furnace is limited to about 500° C. to limit the inner wall temperature of the cracker tubes.

A stream 62 of air passed through forced draft fan K212 before being pre-heated by heat exchange in heat exchanger E2141 to produce a stream 64 of pre-heated air. The pre-heated air of stream 64 is fed to the burners (not shown) of the furnace F201 alongside a stream 70 of natural gas as trim fuel. Pre-heating the air in this way helps reduce the fuel requirement.

The tubes in the radiant section F201 of the furnace are filled with two types of ammonia cracking catalysts in two different layers. A ruthenium-based catalyst is used in the first layer within each tube so that the faster reaction rate allows the metals temperature to be kept to within the design limit of about 660° C. The second layer in the tubes, downstream of the first layer, contains a lower cost but less active nickel-based catalyst.

A stream 24 of cracked gas exits the radiant section F201 of the direct fired tube furnace at about 640° C. and is then fed to economizer E305 to provide the duty required to heat the partially cracked ammonia, thereby reducing the temperature of the cracked gas to about 530° C.

The economizer E305 is depicted as a shell-and-tube style heat exchanger with the partially cracked ammonia gas passing through the tubes and the cracked gas passing through the shell side. However, this arrangement could be reversed or indeed a different style of heat exchanger could be used.

A stream 26 of cracked gas is then fed from the economizer E305 to heat exchanger E310 to provide the duty required to superheat the ammonia gas, thereby further reducing the temperature of the cracked gas to about 389° C.

A stream 28 of cracked gas is then fed from heat exchanger E310 to heat exchanger E311 to provide the duty required to evaporate the further heated liquid ammonia, thereby reducing the temperature of the cracked gas even further to about 109° C.

A stream 30 of cracked gas is then fed from heat exchanger E311 to heat exchanger E312 to provide the duty required to further heat the heated pressurized liquid ammonia, thereby reducing the temperature of the cracked gas further again to about 70° C.

Each of the heat exchangers E310, E311 and E312 is depicted as an individual shell-and-tube style heat exchanger with the ammonia passing through the tubes and the cracked gas passing through the shell side. However, this arrangement could be reversed. Alternatively, the heat exchangers could be combined into a single shell-and-tube style heat exchanger or indeed a different style of heat exchanger could be used.

A stream 32 of cracked gas from heat exchanger E312 is then cooled further by heat exchange with the heat transfer fluid in cooler E323 and then fed as stream 34 to PSA system U501 where it is separated into a stream 40 of hydrogen gas which is removed as product, and a stream 42 of PSA off gas comprising nitrogen gas, residual hydrogen gas and residual ammonia gas. The hydrogen gas in stream 40 may be fed to a hydrogen liquefaction unit (not shown) to produce liquid hydrogen.

All of the PSA off gas in stream 42 may be sent directly as fuel (stream 60) for combustion in the furnace F201. Alternatively, stream 42 may be divided into divided into two portions.

A first portion of the PSA off gas in stream 44 is heated by heat exchange in a heat exchanger E2112 to produce a stream 60 of warmed PSA off gas which is then fed to the burners in the furnace F201, together with air feed 64 and, optionally, the natural gas feed 70 as required. A minimum amount of natural gas is used as trim fuel to provide the balance of fuel required in the fired section.

A second portion may be sent as stream 46 to a multistage compression unit K681 for compression. The compression unit K681 has five stages with an intercooler between each stage, together with an aftercooler following the last stage. Heat is recovered from the compressed gas in the intercoolers and the aftercooler by heat exchange with the heat transfer fluid. Heat may also be recovered from the lube oil and, where a positive displacement compression unit is used, from the cylinder(s) of the compression unit using the heat transfer fluid.

For convenience, the intercoolers and aftercooler are indicated by a single heat exchanger (labelled as E6816A-E) that recovers heat from a stream 48 of compressed PSA off gas by heat exchange with a stream 52 of the heat transfer fluid to produce a stream 50 of cooled compressed PSA off gas and a stream 54 of warmed heat transfer fluid.

The heat transfer fluid warmed in the cooler E323 and in the intercoolers and aftercooler E6816A-E, etc. is then used to provide the duty required to preheat the liquid ammonia by heat exchange in heat exchanger E271.

The cooled compressed PSA off gas in stream 50 is fed to a phase separator C6816 in which any condensate is removed as stream 56. The compressed PSA off gas is then recycled to the PSA system U501 as stream 58 to recover further hydrogen. In this way, the recovery of hydrogen may be increased from 85% (without the recycle) to 95% (with the recycle).

As indicated above, the process can be operated without compression unit K681, resulting in lower hydrogen recovery in the PSA unit 501. Reducing hydrogen recovery will obviously result in less hydrogen gas product. However, reduced hydrogen recovery may still be desirable as the carbon intensity (CI) for the process is lowered as more hydrogen would be in the off gas thereby reducing the requirement for natural gas as trim fuel and reducing carbon dioxide emissions.

A stream 72 of flue gas at about 686° C. passes from the radiant section F201 to the convection section 90 of the furnace F201 where it first provides the duty required to heat the intermediate gas from stream 16 in heat exchanger E2103 thereby reducing the temperature of the flue gas which is then used (as stream 74) to provide the duty required to further heat the heated ammonia gas from stream 12 in heat exchanger E2102 thereby reducing the temperature of the flue gas further. Therefore, the flue gas provides heating duty in a direction countercurrent to the flow of feed gas to the radiant section F201 of the direct fired tube furnace.

The cooled flue gas is then used (as stream 76) to provide the duty required to heat the air from stream 62 in heat exchanger E2142 thereby reducing the temperature of the flue gas further. The further cooled flue gas is then used (as stream 78) to provide the duty required to heat the PSA off gas from stream 44 in heat exchanger E2112 thereby cooling the flue gas further.

The cooled flue gas leaves the convection section 90 of the direct fired tube furnace F201 as stream 80 at a temperature of about 121° C., i.e., above the dew point of water, passes through an induced draft fan K211 and then leaves the process as stream 82. All of the practical energy has been extracted from the flue gas at this point which may now be vented to atmosphere, optionally after further processing if required depending on its composition.

Oil may be present in the liquid ammonia in an amount up to about 5 ppm from boil-off gas compressors (not shown) used with ammonia storage tanks (not shown), either at the location where the ammonia is produced, or onsite where the ammonia is cracked, or indeed anywhere in transit between the two sites. The presence of oil in the ammonia may cause difficulties as the ammonia cracking catalysts may not tolerate the oil. Thus, it may be desirable to remove the oil before the ammonia is exposed to the catalysts. Oil may be removed by passing the ammonia through a bed of activated carbon.

If oil is to be removed from the ammonia, then an oil removal unit (not shown) may be located in stream 2 (i.e., in the feed line to the pump P101), in stream 4 (i.e., between pump P101 and glycol heater E271), in stream 6 (i.e., between glycol heater E271 and heat exchanger E312), in stream 8 (i.e., between heat exchangers E312 and E311) or in stream 10 (i.e., between heat exchangers E311 and E310).

Figure 2:
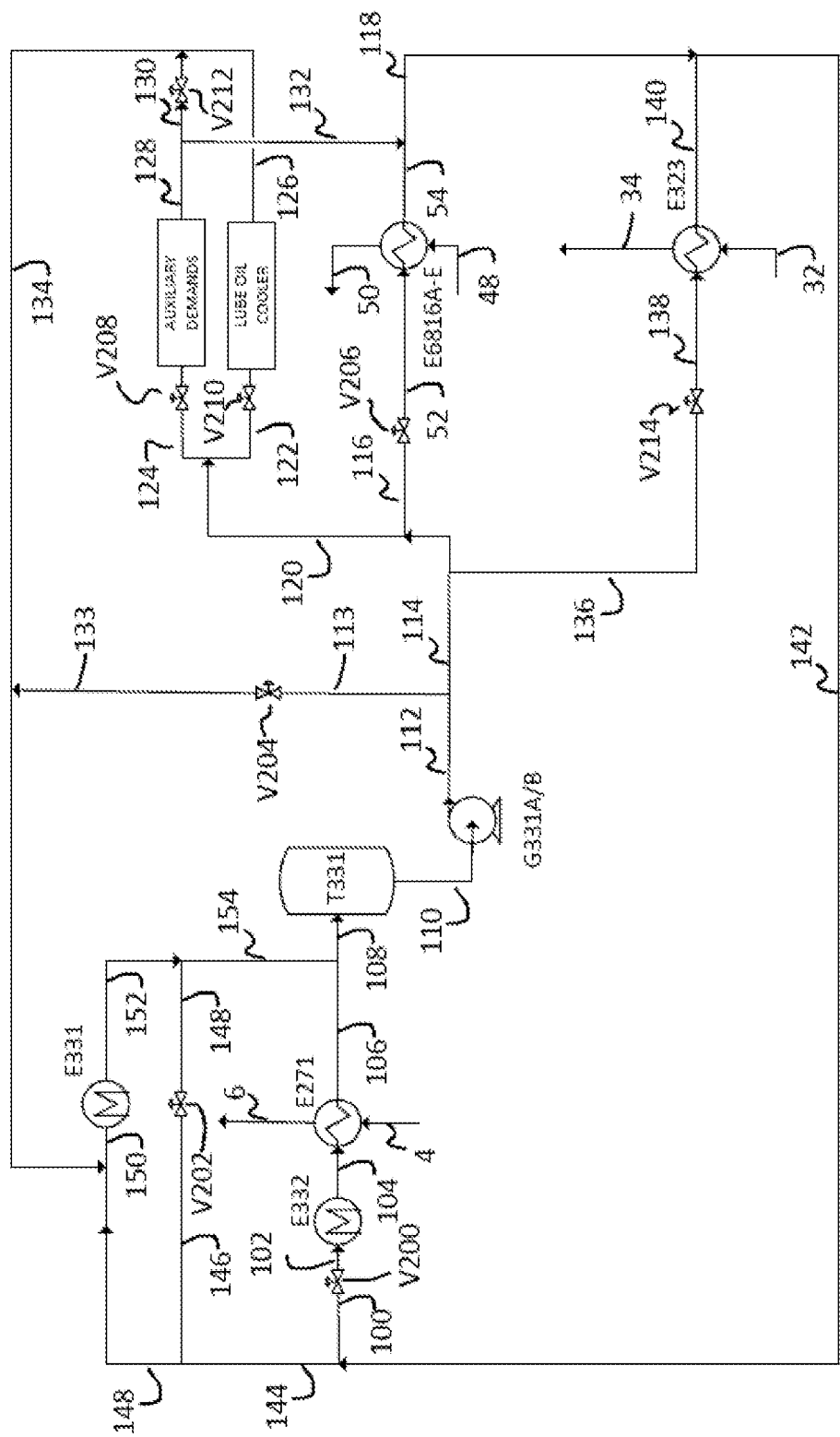
FIG. 2 is a simplified flowsheet of one embodiment of the present invention.

FIG. 1 shows the process side of the flowsheet and FIG. 2 shows the glycol system that engages with the process depicted in the flowsheet of FIG. 1. The features common to both figures have been given the same reference numerals.

About 39.9 tonnes/h of 57.5 wt. % ethylene glycol in water at around 30° C. is withdrawn from the buffer tank T311 as stream 110 and pumped in pumps G331A/B (two pumps in parallel) to produce pumped stream 112 at about 5 bar. Stream 112 is then distributed to the heat exchangers that will use this stream as a cooling medium.

Stream 112 may be split into two parts, streams 113 and 114. Stream 113 is discussed below. Stream 114 is itself divided into three parts, streams 136, 116 and 120.

Stream 136 takes about 4.3 tonnes/h of stream 114 of glycol solution, passes through valve V214 and is fed as stream 138 to heat exchanger E323 where it cools the cracked hydrogen-rich stream 32 from 69° C. to 50° C., increasing the temperature of the glycol stream to about 63° C. (stream 140). The optimum temperature for stream 140 is a compromise of temperature rise and heat exchanger size. If the glycol flowrate were to be reduced, stream 140 would reduce in temperature and the required temperature difference within exchange E323 would increase, reducing its size, but the impact of this is that the recycled glycol stream 142 reduces in temperature, reducing the temperature difference in exchanger E271, and increasing the size of that exchanger.

Stream 116 takes about 17.1 tonnes/h of stream 114 of glycol solution and uses it to cool the intercooler and aftercooler of compressor K681 (see FIG. 1—not shown in FIG. 2) in exchangers E6816 A to E from the discharge temperature of each stage, e.g., about 120° C., down to about 40° C. for the intercoolers and 50° C. for the aftercooler, which is the temperature determined in the example as optimal for the PSA feed. The streams are typically cooled to keep them above the dew point and prevent an ammonia-rich condensate stream being formed. If the compressors are intercooled and aftercooled below the dewpoint, phase separators are required to separate the ammonia-rich condensate which could then be used in an SCR to provide part of the ammonia used to eliminate $NO_x$.

Stream 120 takes about 18.5 tonnes/h of stream 114 of glycol solution and uses it for other cooling duties required by the compressor, such as cooling the lubrication oil (stream 122) and auxiliary demands (stream 124) such as cylinder cooling for this example which has a positive displacement compressor. The resultant warmed streams 126 and 128/130 may be combined to form stream 134 which is combined with stream 148 to form stream 150 which is fed to the water (or air) cooler E331. Alternatively, a portion of stream 128 may be diverted as stream 132 by valve V212 and combined with stream 54 to form stream 118 which in turn is combined with stream 140 to form stream 142.

The glycol solution heated in E323, E6816A-E and in the other cooling requirements of the compressor K681 is used to heat the feed liquid ammonia from about −32° C. to about 53° C. To do this, the glycol solution needs to be warm enough, preferably over 60° C.

In some of the coolers, the glycol solution is heated to a temperature significantly lower than the temperature required in stream 142 and so that stream, shown as stream 134, is diverted not to the ammonia heating exchanger E271 but to E331. E331 is a heat exchanger that uses cooling water (or air if it is an air-cooled exchanger) to cool the glycol solution fed to it to around 35° C. However, most of the recirculating glycol solution, about 31.3 tonnes/h, is fed through stream 142 to be used to heat the feed ammonia.

In the process depicted in FIG. 2, there is too much "hot" glycol in stream 142, and so the excess is diverted through stream 144 to stream 148 where it combines with stream 134 to be cooled, as stream 150, in exchanger E331 to produce cooled stream 152. Stream 146 is a bypass that can be used to control the temperature of stream 154 by using valve V202 to control a stream of bypass glycol solution so that when stream 148 mixes with stream 152, the resulting stream 154 is the required temperature. However, in the worked example below, valve V202 is closed and so streams 146 and 148 have zero flowrate.

Valve V202 is present in case the cooling water (or air temperature if E331 is air cooled) drops, thereby increasing the duty of E331 and reducing the temperature of stream 152. There will also be flow control on the flows to the compressor aftercoolers, shown as valve V206, which will be used to control the flow of "cold" glycol solution to maintain the 40° C. gas temperature at the discharge of the intercoolers.

When compression unit K681 is operating, the temperature of stream 100 will be high enough, e.g., over 60° C., to heat the feed ammonia stream. However, if compression unit K681 is not operating, either due to being out of service or because it has been turned off to reduce the PSA's hydrogen recovery, to reduce the Carbon Intensity of the cracking process, or if there is a reduction in heat available from the compressor aftercoolers due to K681 operating at a reduced rate (or part load), again to reduce PSA recovery but not to the minimum recovery that turning the compressor off would achieve, extra heat can be provided by using the electrical heater E332. The ammonia could be heated directly by an electrical heater. However, using the heater on the glycol system instead enables better, smoother operation of the glycol system, allowing it to operate continuously regardless of the state of operation of compressor unit K631.

The feed ammonia stream 4 at about −31° C. is heated to about 53° C. by cooling stream 104 of glycol solution from about 65° C. to about 28° C. Cooled stream 106 then is then combined with stream 154, at 35° C., to produce stream 108 at around 30° C. which is fed to the buffer tank T331.

FIG. 2 depicts a number of valves that demonstrate how the cycle can be controlled.

Valve V204 can be used to bypass the cooling flow to the compression unit K681 and return "cold" ammonia via stream 133 to steam 134, such as when compression unit K681 is not operating—the "cold" glycol solution would make its way through stream 134, 148 and 144 (reverse flow to that indicated) to join stream 100, pass through valve V200 to the heater E332 via stream 102.

Valves V208, V210, V206 and V214 can be used to distribute the "cold" glycol solution to the heat exchangers requiring cooling, based on control of the temperature of the resulting "hot" glycol solution (increasing flow to an exchanger will generally reduce the "hot" glycol temperature from the exchanger).

Valve V212 is used to divert glycol solution leaving an exchanger where its temperature would be too low and detrimentally impact (i.e., reduce below the temperature which would allow the glycol solution to heat the feed ammonia to 53° C.) the temperature of the recycling glycol solution.

Valve V200 is to control the split of heated glycol solution between E271 and E331, diverting glycol solution in excess of what is required by E271.

Valve V202 is used to bypass E331 to allow temperature control of stream 154.

In the present example, the sum of the cooling duties required for the glycol system to perform—the inter- and aftercoolers, and auxiliary duties of the compressor K681—is greater than the liquid ammonia heating duty for the "hot" glycol solution and so supplemental cooling is required, provided by E331. If the load on the compressor is reduced, such as when the compressor is turned down, the duty of E331 would reduce and ultimately heating of the glycol solution would be required, provided by heater E332.

The present invention will now be illustrated by the following non-limiting example.

EXAMPLE

The process depicted in FIG. 1 has been simulated by computer (Aspen Plus, ver. 10, Aspen Technology, Inc., Massachusetts, USA) for a plant designed to produce 30 tonnes/day hydrogen (stream 40).

The activities of the ruthenium-based catalyst and nickel-based catalyst in the adiabatic reactors and in the tubes were modelled using rate equation No. 9 given in Lamb et al (Int. J. Hydrogen Energy, 44 (2019) pp 3726-3736) as a basis. For the purpose of the simulation, it was assumed that the activity of the ruthenium-based catalyst conformed to the rate equation but that the activity of the nickel-based catalyst was 20% of that predicted by the rate equation.

The results are depicted in Table 2.

TABLE 2

| Composition, mol % | 2 | 4 | 6 | 12 | 14 | 16 | 18 | 20 | 22 | 24 |
|---|---|---|---|---|---|---|---|---|---|---|
| Hydrogen | 0.00 | 0.00 | 0.00 | 0.00 | 0.00 | 7.75 | 7.75 | 29.83 | 29.83 | 73.93 |
| Nitrogen | 0.00 | 0.00 | 0.00 | 0.00 | 0.00 | 2.58 | 2.58 | 9.94 | 9.94 | 24.64 |
| Ammonia | 99.81 | 99.81 | 99.81 | 99.81 | 99.81 | 89.49 | 89.49 | 60.07 | 60.07 | 1.33 |
| Water | 0.19 | 0.19 | 0.19 | 0.19 | 0.19 | 0.18 | 0.18 | 0.15 | 0.15 | 0.10 |
| Oxygen | 0.00 | 0.00 | 0.00 | 0.00 | 0.00 | 0.00 | 0.00 | 0.00 | 0.00 | 0.00 |
| Argon | 0.00 | 0.00 | 0.00 | 0.00 | 0.00 | 0.00 | 0.00 | 0.00 | 0.00 | 0.00 |
| Carbon Dioxide | 0.00 | 0.00 | 0.00 | 0.00 | 0.00 | 0.00 | 0.00 | 0.00 | 0.00 | 0.00 |
| Methane | 0.00 | 0.00 | 0.00 | 0.00 | 0.00 | 0.00 | 0.00 | 0.00 | 0.00 | 0.00 |
| Ethane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Butane | 0.00 | 0.00 | 0.00 | 0.00 | 0.00 | 0.00 | 0.00 | 0.00 | 0.00 | 0.00 |
| Pentane | 0.00 | 0.00 | 0.00 | 0.00 | 0.00 | 0.00 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |

TABLE 2-continued

| | | | | | | | | | | |
|---|---|---|---|---|---|---|---|---|---|---|
| Flowrate, kmol/hr | 447.7 | 447.7 | 447.7 | 447.7 | 447.7 | 472.1 | 472.1 | 558.9 | 558.9 | 882.9 |
| Flowrate, kg/hr | 7626.4 | 7626.4 | 7626.4 | 7626.4 | 7626.4 | 7626.4 | 7626.4 | 7626.4 | 7626.4 | 7626.4 |
| Pressure, bar (a) | 1.0 | 46.4 | 46.0 | 44.8 | 42.8 | 41.3 | 40.3 | 38.8 | 38.4 | 35.4 |
| Temperature, ° C. | −33.7 | −32.2 | 53.0 | 260.0 | 420.0 | 357.0 | 590.0 | 387.0 | 500.0 | 639.9 |
| Composition, mol % | 26 | 34 | 44 | 40 | 60 | 70 | 64 | 72 | 76 | 82 |
| Hydrogen | 73.93 | 73.93 | 12.42 | 100.00 | 12.42 | 0.00 | 0.00 | 0.00 | 0.00 | 0.00 |
| Nitrogen | 24.64 | 24.64 | 82.78 | 0.00 | 82.78 | 1.00 | 77.27 | 78.53 | 78.53 | 78.53 |
| Ammonia | 1.33 | 1.33 | 4.48 | 0.00 | 4.48 | 0.00 | 0.00 | 0.00 | 0.00 | 0.00 |
| Water | 0.10 | 0.10 | 0.32 | 0.00 | 0.32 | 0.00 | 1.05 | 15.69 | 15.69 | 15.69 |
| Oxygen | 0.00 | 0.00 | 0.00 | 0.00 | 0.00 | 0.00 | 20.73 | 1.15 | 1.15 | 1.15 |
| Argon | 0.00 | 0.00 | 0.00 | 0.00 | 0.00 | 0.00 | 0.92 | 0.56 | 0.56 | 0.56 |
| Carbon Dioxide | 0.00 | 0.00 | 0.00 | 0.00 | 0.00 | 0.50 | 0.03 | 4.07 | 4.07 | 4.07 |
| Methane | 0.00 | 0.00 | 0.00 | 0.00 | 0.00 | 93.96 | 0.00 | 0.00 | 0.00 | 0.00 |
| Ethane | 0.00 | 0.00 | 0.00 | 0.00 | 0.00 | 4.20 | 0.00 | 0.00 | 0.00 | 0.00 |
| Pentane | 0.00 | 0.00 | 0.00 | 0.00 | 0.00 | 0.30 | 0.00 | 0.00 | 0.00 | 0.00 |
| Butane | 0.00 | 0.00 | 0.00 | 0.00 | 0.00 | 0.02 | 0.00 | 0.00 | 0.00 | 0.00 |
| Pentane | 0.00 | 0.00 | 0.00 | 0.00 | 0.00 | 0.02 | 0.00 | 0.00 | 0.00 | 0.00 |
| Ethylene Glycol | 0.00 | 0.00 | 0.00 | 0.00 | 0.00 | 0.00 | 0.00 | 0.00 | 0.00 | 0.00 |
| Flowrate, kmol/hr | 882.9 | 882.9 | 262.8 | 620.0 | 262.8 | 27.8 | 435.1 | 713.1 | 713.1 | 713.1 |
| Flowrate, kg/hr | 7626.4 | 7626.4 | 6376.4 | 1250.0 | 6376.4 | 472.7 | 12553.2 | 19402.2 | 19402.2 | 19402.2 |
| Pressure, bar (a) | 35.0 | 33.4 | 1.4 | 32.7 | 1.2 | 5.0 | 1.1 | 1.0 | 1.0 | 1.0 |
| Temperature, ° C. | 530.1 | 50.0 | 35.0 | 50.0 | 138.0 | 30.0 | 236.7 | 685.9 | 304.4 | 131.8 |

The results indicate that, with a 1.33 mol. % ammonia slip (stream 24) from the cracker (tube furnace 201) and 95% recovery of hydrogen in the PSA unit, 7626 kg/h of ammonia is required (stream 2) as feed, together with 472.7 kg/h of natural gas (stream 70) as fuel in addition to the PSA off gas (stream 60) in order to fire the cracker.

For a given hydrogen recovery and ammonia slip, the effect of using the cracked gas (instead of the flue gas) to provide the duty required to heat the partially cracked gas (stream 20) to the feed temperature of the catalyst-filled tubes of the cracker (F201) is to reduce the overall carbon intensity (CI) process.

In an alternative process in which the glycol system is replaced with a cooling water system achieving the same purpose, a heater, probably an electric heater, would be required to do the heating of the ammonia which would require an extra 0.86 MW of power and result in an increase in the Carbon Intensity of the process.

While the invention has been described with reference to the preferred embodiments depicted in the figure, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" and incorporates "consisting of" rather than meaning "consisting of" exclusively.

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for cracking ammonia comprising:
   warming heat transfer fluid to produce a warmed heat transfer fluid;
   pumping liquid ammonia to produce a pumped liquid ammonia;
   pre-heating the pumped liquid ammonia produce a pre-heated liquid ammonia;
   vaporizing the pre-heated liquid ammonia to produce an ammonia gas;
   heating the ammonia gas to produce a heated ammonia gas;
   combusting a fuel with an oxidant gas in a furnace to heat catalyst-containing reactor tubes and produce a flue gas;
   feeding the heated ammonia gas, or a partially cracked ammonia gas derived therefrom, to the catalyst-containing reactor tubes to cause cracking of ammonia and produce a cracked gas comprising hydrogen gas, nitrogen gas and residual ammonia gas;
   cooling the cracked gas to produced cooled cracked gas; and
   recovering hydrogen gas from the cooled cracked gas in a pressure swing adsorption (PSA) unit to produce a hydrogen gas as product and PSA off gas comprising nitrogen gas, residual hydrogen gas and residual ammonia gas,
   wherein a portion of the PSA off gas is compressed in a compression unit to produce compressed PSA off gas which is recycled to the PSA unit and at least part of the duty required to warm the heat transfer fluid is provided by using the heat transfer fluid to cool the compression unit, and
   wherein a part of the duty required to pre-heat the pumped liquid ammonia is provided by heat exchange with the warmed heat transfer fluid.

2. The process of claim 1 wherein the liquid ammonia is pumped from a storage vessel.

3. The process of claim 1 wherein the majority of the duty required to cool the compression unit is the duty required to remove heat of compression from the PSA off gas.

4. The process of claim 1 wherein the compressed PSA off gas is at or above its dew point temperature.

5. The process of claim 1 wherein, during periods when the compression unit is operating at part load, at least part of the duty required to warm the heat transfer fluid is provided from an external source.

6. The process of claim 5 wherein the external source is an electrical heater.

7. The process of claim 1 wherein any remaining part of the duty required to warm the heat transfer fluid is provided by heat exchange with cracked gas and/or flue gas.

8. The process of claim 1 wherein any excess heat is removed from the heat transfer fluid using air coolers and/or cooling water.

9. The process of claim 1 wherein the heat transfer fluid is pumped around a circuit.

10. The process of claim 1, wherein the heat transfer fluid is an aqueous solution of a glycol.

11. The process of claim 10, wherein the aqueous solution comprises from about 50 wt. % to about 60 wt. % glycol.

12. The process of claim 10, wherein the glycol is selected from the group consisting of ethylene glycol and propylene glycol.

13. The process of claim 1, wherein warmed heat transfer fluid is at a temperature of over 60° C.

14. The process of claim 1, wherein a further portion of PSA off gas is pre-heated and fed as at least part of the fuel to the furnace.

15. The process of claim 1 comprising partially cracking the heated ammonia gas in an adiabatic reaction unit comprising at least one catalyst bed to produce the partially cracked ammonia gas for feeding to the catalyst-filled reactor tubes.

16. Apparatus for cracking ammonia comprising:
a source of liquid ammonia;
a pump comprising an inlet in fluid flow communication with the source of liquid ammonia and an outlet for pumped liquid ammonia;
a furnace comprising:
  a radiant section comprising at least one inlet for fuel and oxidant gas in fluid flow communication with at least one burner, an ammonia feed inlet in fluid flow communication with the pump, and catalyst-filled reactor tubes having upstream ends in fluid flow communication with the ammonia feed inlet and downstream ends in fluid flow communication with an outlet for cracked gas, and
  a convection section in fluid flow communication with the radiant section comprising an outlet for flue gas,
a PSA unit comprising an inlet in fluid flow communication with the outlet for cracked gas in the radiant section of the furnace, an outlet for hydrogen gas and an outlet for PSA off gas;
a compression unit comprising an inlet in fluid flow communication with the outlet for PSA off gas in the PSA unit, and an outlet for compressed PSA off gas in fluid flow communication with the inlet of the PSA unit,
wherein the apparatus further comprises:
  at least one cooler located within the compression unit and arranged for cooling the compression unit by heat exchange against a heat transfer fluid;
  a pre-heating unit located downstream of the pump and arranged for pre-heating pumped liquid ammonia by heat exchange against the heat transfer fluid; and
  at least one heat exchanger located upstream of the ammonia feed inlet of the furnace for vaporizing pre-heated liquid ammonia and heating ammonia gas by heat exchange with the cracked gas.

17. The apparatus of claim 16 wherein the source of liquid ammonia is a storage vessel.

18. The apparatus of claim 16 comprising an external heater for warming the heat transfer fluid.

19. The apparatus of claim 18 wherein the external heater is an electrical heater.

20. The apparatus of claim 16 comprising at least one heat exchanger arranged to warm the heat transfer fluid by heat exchange against cracked gas and/or flue gas.

21. The apparatus of claim 16 comprising at least one air cooler and/or at least one water cooler arranged to cool the heat transfer fluid.

22. The apparatus of claim 16 comprising a circuit for the heat transfer fluid, said circuit comprising a pump for moving the heat transfer fluid around the circuit.

23. The apparatus of claim 16 wherein the outlet for PSA off gas in the PSA unit is in fluid flow communication with said at least one inlet for fuel and oxidant gas in the radiant section of the furnace and the apparatus comprises at least one heat exchanger located upstream of said at least one inlet for fuel and oxidant gas and arranged for pre-heating the PSA off gas by heat exchange against cracked gas and/or flue gas.

24. The apparatus of claim 16 comprising an adiabatic reaction unit for partially cracking heated ammonia gas, the unit comprising an inlet for heated ammonia gas in fluid communication with the pump, at least one catalyst bed having an upstream end in fluid communication with the inlet and a downstream end in fluid communication with an outlet for partially cracked ammonia gas,
wherein the outlet for partially cracked ammonia gas is in fluid flow communication with the ammonia feed inlet of the furnace.

* * * * *